US005788426A

United States Patent [19]
Daniels

[11] Patent Number: 5,788,426
[45] Date of Patent: Aug. 4, 1998

[54] CUTTING TOOL CARTRIDGE HOLDER

[75] Inventor: Steven B. Daniels, Decatur, Ind.

[73] Assignee: Ultra Tool Corporation, Decatur, Ind.

[21] Appl. No.: 811,221

[22] Filed: Mar. 5, 1997

[51] Int. Cl.$^6$ ............................................. B23C 5/24
[52] U.S. Cl. .................... 407/36; 407/38; 407/46; 407/53
[58] Field of Search ................ 407/36, 33, 35, 407/39, 40, 41, 43, 44, 46, 47, 51, 52, 53, 119, 118; 409/234

[56] References Cited

U.S. PATENT DOCUMENTS

| | | | |
|---|---|---|---|
| 5,102,268 | 4/1992 | Mitchell | 407/36 |
| 5,542,794 | 8/1996 | Smith et al. | 407/35 |
| 5,584,045 | 12/1996 | Tanabe et al. | 407/119 X |
| 5,624,766 | 4/1997 | Moriguchi et al. | 407/119 X |
| 5,667,343 | 9/1997 | Hessman et al. | 407/38 X |

*Primary Examiner*—A. L. Pitts
*Assistant Examiner*—Henry W. H. Tsai
*Attorney, Agent, or Firm*—Donald R. Fraser

[57] ABSTRACT

A cutting tool is disclosed having an annular array of V-shaped pockets formed in the body thereof for receiving complimentary shaped tool cartridges. Threaded fasteners are provided to selectively retain one of the cartridges in each of the pockets.

11 Claims, 2 Drawing Sheets

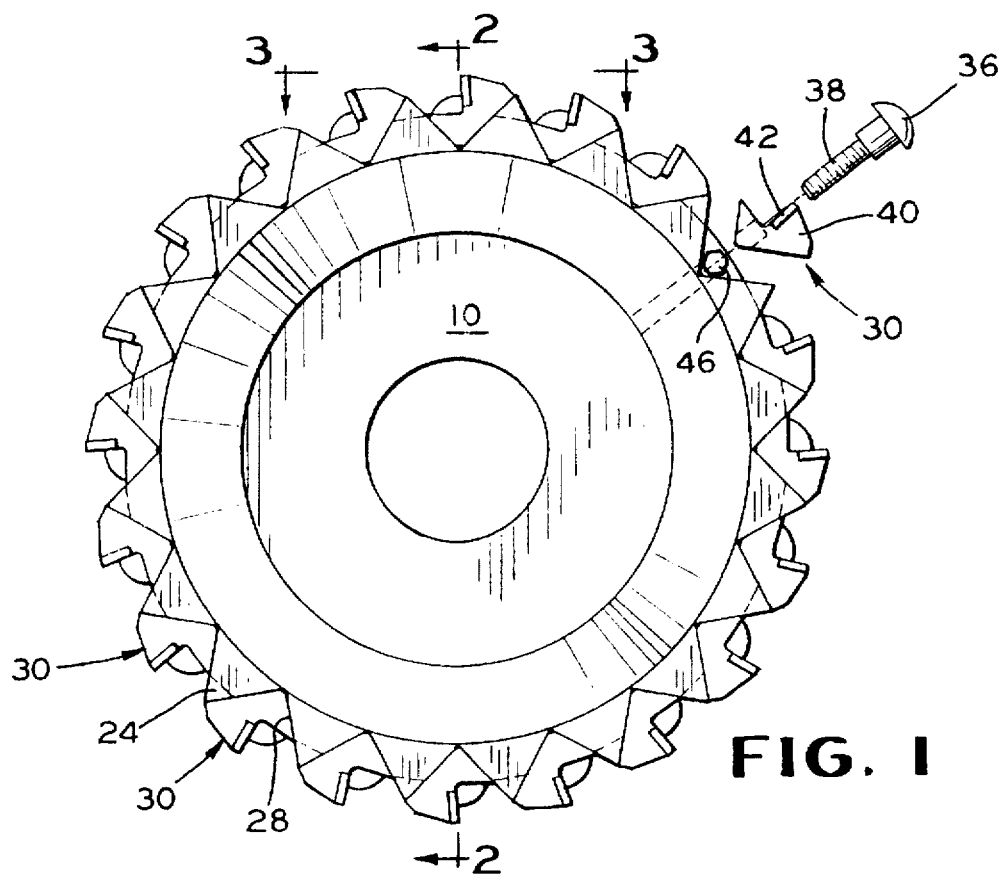
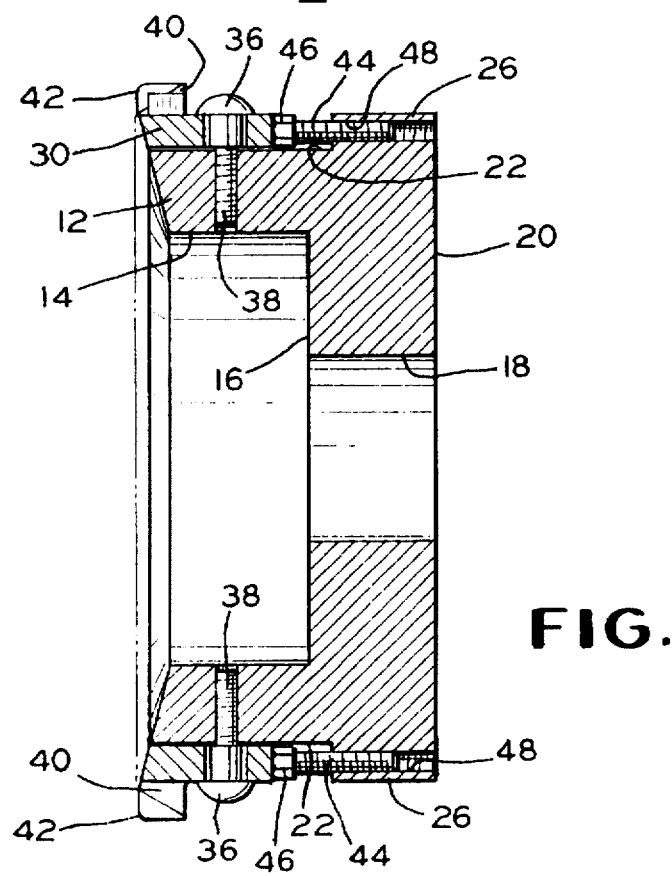

CUTTING TOOL CARTRIDGE HOLDER

BACKGROUND OF THE INVENTION

The present invention relates to cutting tools, and, more specifically, to a new and improved construction of a cutting tool of the type having an annular cutter body to which a plurality of different cutting tool cartridges may be uniquely affixed.

Generally, the cutting tool of the present invention is used in universal milling and boring machines and numerical controlled machines wherein one or more machine operations on a work piece is performed in accordance with a programmed schedule. Such machines are capable of typically holding a number of cutting tools each being a particular machining function.

The specific tools are provided with a number of cutting members which have a given duty cycle. Once the cutting edges are worn, the tools are replaced with an entire new replacement. Also, should it be required to use a differently shaped insert as a triangular insert, a square insert, or a forty-five degree lead, an entirely new replacement was required.

SUMMARY OF THE INVENTION

It is an object of the invention to produce a new cutting tool capable of utilizing a number of different tool inserts designed to perform differing cutting and machining operations.

Another object of the invention is to produce a cutting tool having a cutter body capable of receiving cutting tool cartridges which may be driven in clockwise direction with one set of cartridges and in an opposite direction with the replacement of another set of cartridges.

Another object of the invention is to produce a cutting tool which may be formed of light weight material, capable of achieving higher feed rates, and lower consumption of energy.

Still another object of the invention is to produce a cutting tool capable of receiving a number of different and distinct geometrically configured cutting tool cartridges which may be readily adjusted for clockwise and counter-clockwise rotation.

It is still a further object of the invention to produce a cutting tool having a cutter body capable of incorporating different cutter inserts which may be readily interchanged thereby enabling a single cutter body to be utilized in a number of different machining operations.

The above, as well as other objectives and advantages of the invention are typically achieved by a cutting tool comprising an annular cutting body having a plurality of spaced apart V-shaped pockets for receiving complimentary shaped tool cartridges; a first threaded fastener adapted to extend from the cartridge into the jacket for general radial adjustment to secure the cartridge to the cutting body; a second threaded fastener adapted to extend from the cutter body toward the pocket into contact with the cartridge to set the height of the cartridge in a direction normal to the radial adjustment of the first threaded fastener; and a cutting member mounted on the cartridges.

BRIEF DESCRIPTION OF THE DRAWINGS

The above objects and advantages of the invention will become readily apparent to one skilled in the art from reading the following detailed description of the preferred embodiment of the invention when considered in the light of the accompanying drawings, in which FIG. 1 is a partially exploded plan view of a cutting tool capable of recieving a plurality of tool cartridges incorporating the invention;

FIG. 2 is a sectional view of the cutting tool illustrated in FIG. 1 taken along line 2—2 thereof;

DETAILED DESCRIPTION OF THE PREFERRED EMBODIMENT

Figure 3:
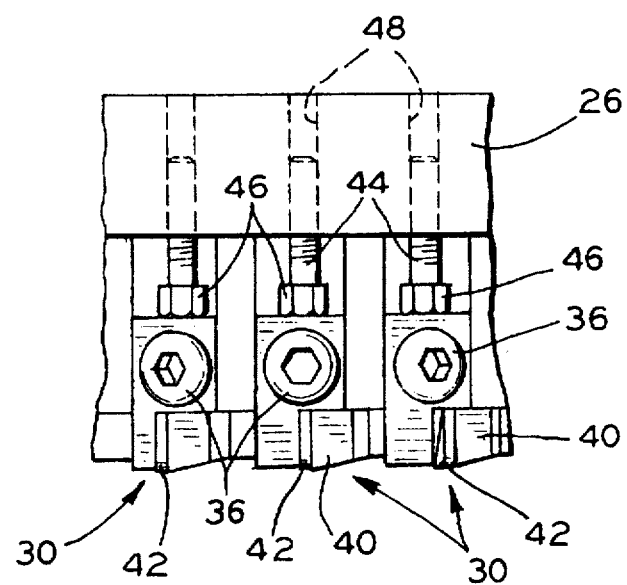
FIG. 3 is a fragmentary view of the cutting tool taken along line 3—3 of FIG. 1.

Referring to the drawings, there is illustrated a cutting tool for use in universal milling and boring machines and numerical controlled machines wherein one or more machining operations on a work piece is performed in accordance with a programmed schedule.

FIGS. 1 to 4 show the preferred embodiment of the invention wherein there is shown a cutting tool including an annular cutter body 10 having an angularly inwardly extending front face 12. The radially inner terminus of the face 12 joins with an inwardly extending wall 14 which terminates in an intermediate wall 16. A hollow cylindrical bore 18 is provided to extend between the wall 16 and a rear face 20.

The outer surface of the body 10 is provided with a zone 22 of reduced outer diameter which, in turn, defines a radially outwardly extending front and rear collar portions 24 and 26, respectively.

The front collar portion 24 is suitably provided with a plurality of spaced apart generally V-shaped pockets 28. The pockets 28 are adapted to receive similarly configured tool cartridges 30.

Figure 4:
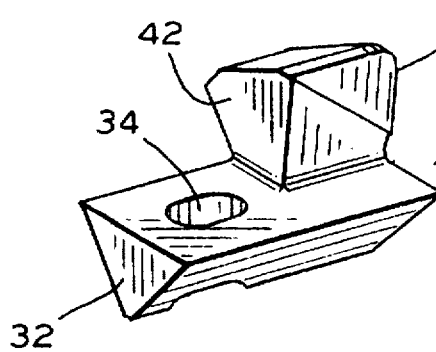
FIG. 4 is a perspective view of a cutting tool cartridge of the type illustrated in FIGS. 1, 2, and 3 wherein the cutting edge is brazed to the cartridge.

The tool cartridge 30 illustrated in FIGS. 1, 2, and 3 is illustrated in perspective in FIG. 4. The cartridge 30 has a main body portion 32 which is generally triangular in cross-section. The triangular shape functions to cause the cartridge 30 to firmly seat and align itself within the respective pocket 28. An elongate slot 34 in the main body portion 32 is formed to extend from the upper surface to the juncture of the other two surfaces of the main body. The slot 34 is formed to receive the threaded shank 37 of a threaded fastener 36. The threaded fastener 36 may be of the type having a head adapted to receive an Allenhead wrench, for example. The threaded shank 37 of the fastener 36 is received within an internally threaded bore 38 formed in the front collar 24 and extends radially inwardly from the base of each of the V-shaped pockets 28. It will be appreciated that the configuration of the elongate slots 34 permits slight linear adjustment of the cartridge 30 in the perspective pocket 28 relative to the cutter body 10, as will be explained hereinafter.

The cartridge 30 has a cutting head 40 capable of being provided with a cutting edge 42 formed of a polycrystalline diamond material which is secured to the head 40 by brazing, for example. The cutting edge 42 may be of a polycrystalline diamond (PCD) composite material backed with cemented tungsten carbide of the type manufactured by DeBeers Industrial Diamond Division under the trademark SYNDITE. This product is manufactured by sintering together carefully selected synthetic diamond particles at very high temperature and pressure in the presence of a solvent/catalyst metal. The resultant product combines the hardness, abrasion resistance and thermal conductivity of diamond with the toughness of cemented tungsten carbide. The presence of the metallic solvent/catalyst and the cemented tungsten carbide substrate render the product suitable for processing by electrodes charge machining (EDM). The cemented tungsten carbide backing allows the product to be used as a brazeable inset providing the cutting edge 42 for machining non-ferrous materials such as aluminum alloys, plastics, and wood based products.

The adjustment of the cartridge 30 relative to the cutter body 10 is further achieved by a threaded fastener 44 having a hex-shaped head 46. The fastener 44 is received within a generally horizontally extending internally threaded bore 48 formed in the rear collar 26.

Final adjustment of the cartridge 30 is achieved by loosening the threaded fastener 36 by slightly backing the fastener 36 radially outwardly of the threaded bore hole 38. At this stage, the cartridge 30 is movable with respect to the fastener 36. Adjustment may be made by turning the threaded fastener 44 in the desired direction to cause it to travel inwardly or outwardly of the threaded bore hole 48. In the event the fastener 44 is caused to travel outwardly of the threaded bore hole 48, the associated head 46 will cam the cartridge 30 outwardly in a direction generally parallel to the axis of rotation of the cutter body 10. As soon as the desired adjustment is achieved, the threaded fastener 36 is tightened.

The structure described above results in a cutting tool assembly which permits easy and exacting insertion of the cartridge 30 onto the cutter body 10. More specifically, it will be appreciated that initially the cartridge 30 is positioned within a V-shaped pocket 28. Clearly, the coacting V-shaped configuration of the cartridge 30 is advantageous in resulting in the inherent feature of easy and exacting positioning of the cartridge in the respective pocket 28 of the cutter body. Furthermore, the configuration enables the substitution of the cartridge 30 illustrated in detail in FIG. 4 with the mirrored image cartridge 50 illustrated in FIG. 5. Such substitution makes it possible for the cutting tool assembly illustrated in FIGS. 1 through 4 which operates in a counterclockwise direction when viewing FIG. 1 and allows a reversal in the machining operation by merely removing the cartridges 30 from the cutter body 10 and replacing them with the cartridge 50 illustrated in FIG. 5. Such interchangeability has not been possible with the cutting tools of the prior art.

The cartridge 30 employs a cutting edge 42 formed of polycrystalline diamond material which is made specifically for machining nonferrous metals and highly abrasive nonmetallic material. The cutting edges 42 are found of a multitude of tiny man-made diamond particles imbedded in a tungsten carbide substrate. In operation, as the cutting edge 42 wears some of diamond particles away, more sharp diamond particles are exposed to, in effect, form a new tough cutting edge. In general, the coarser the grade of diamond particle, the greater the resistance to abrasive wear, whilst with a similar degree of edge penetration, finer grades achieve better edge quality.

The mirror image cartridge 50 contains the same features as the cartridge 30 illustrated in FIG. 4. More specifically, the cartridge 50 has a main body portion 52 which is generally triangular in cross-section. An elongate slot 54 is formed to extend from the upper surface to the juncture of the other two surfaces of the body portion 52. The slot 54 is employed to receive the threaded shank of a threaded fastener for receiving the cartridge 50 within a pocket in a cutter body in the same fashion as the cartridge 30. Also, the cartridge 50 is provided with a cutting head 60 capable of supporting a cutting edge 62 formed of a polycrystalline diamond material secured thereto.

It will be noted that the cutting edges 42 and 62 are disposed normal or perpendicular to the upper surface of the cartridges 30 and 50, respectively. Since the cross-section of the body portions 32 and 52 are triangular, the side surfaces are inclined in respect of each other to produce an included angle which is substantially identical with the included angle of the side walls defining the pockets 28 of the cutter body 10. However, to satisfactorily effect the reversibility of the machining operation, the cutting edges 42 and 62 are typically formed at approximately one half of the included angle between the side surfaces of the cartridges 30 and 50. Therefore, if the included angle between the side surfaces is 90°, the angle of the cutting edges would be 45°.

Figure 5:
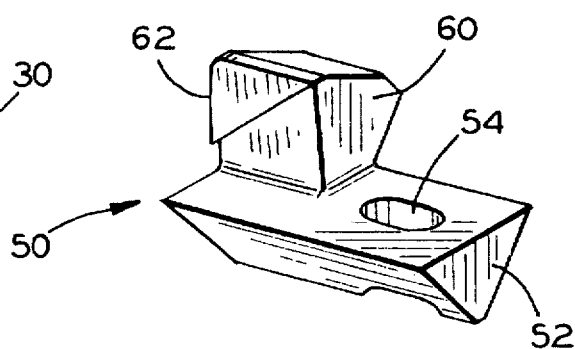
FIG. 5 is a perspective view of a cutting tool cartridge which is a mirror-image of the cartridge illustrated in FIG. 4.
Figure 6:
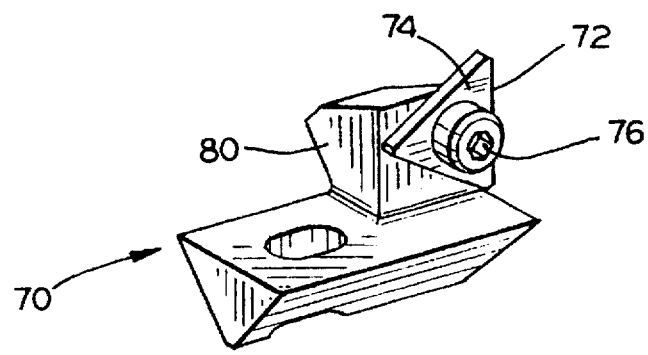
FIG. 6 is a perspective view of a modified form of the cutting tool cartridge illustrated in FIG. 4 wherein the cutting tool is fastened to the cartridge by a threaded fastener.

A further embodiment of a tool cartridge of the invention is illustrated in FIG. 6 wherein there is illustrated a tool cartridge 70. The tool cartridge 70 is structurally the same as the structure of the embodiments illustrated in FIGS. 4 and 5 with the exception of the type of cutting edge. The cutting edge 72 used in this embodiment is formed on an insert 74 which, rather than being brazed to the cutting head 80, is attached thereto by a threaded fastener 76 such as a set screw having a head capable of receiving an Allenhead wrench for adjustment thereof. The insert 74 is formed of tungsten carbide, for example, which is used for machining ferrous metals.

It will be appreciated that the cutting tool illustrated and described is capable of cutting or machining material clearly and efficiently. The particular configuration causes efficient chipmaking action which tends to reduce to minimize the amount of energy necessary to drive the cutting tool and tends to minimize the elevation of operating temperatures. Therefore, production runs should be increased and closer tolerances may be achieved in the production parts.

The importance of a cutter body having the inherent ability to receive either right hand or left hand (mirror-image) cartridges of the type illustrated in FIG. 4 and 5 is of paramount importance when considering the advantages of the cutting tool of the invention.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A cutting tool comprising:
   an annular cutter body having an axis of rotation and plurality of spaced apart pockets for receiving tool cartridges formed in the peripheral margin of said body;
   a tool cartridge of a shape complimentary with the pockets of said cutter body adapted to be received within each of the pockets of said body each of said tool cartridge including a cutting member mounted thereon; and
   means for adjusting and securing said cartridge in the pockets of said cutter body, said means including:

1) a first threaded bore hole formed in each of the pockets in said cutter body, said first bore hole extending radially of said cutter body generally perpendicular to the axis of rotation of said cutter body;

2) a first threaded fastener extending from said cartridge and threadably received within each of said first bore holes formed in each of the pockets of said cutter body;

3) a second threaded bore hole formed to communicate with each of the pockets in said cutter body, said second bore hole extending parallel with the axis of rotation of said cutter body and generally perpendicular to said first threaded bore hole;

4) a second threaded fastener having a head and a threaded shank, the threaded shank received within each of said second bore holes formed in said cutter body so that when said second fastener is turned the head bears against said respective cartridge to urge said cartridge in a direction parallel with the axis of rotation of said cutter body.

2. A cutting tool as defined in claim 1 wherein said tool cartridge is provided with an aperture through which said first threaded fastener is adapted to extend.

3. A cutting tool as defined in claim 2 wherein the aperture in said tool cartridge permits relative movement of said cartridge of said cutter body.

4. A cutting tool as defined in claim 3 wherein the relative movement of said tool cartridge is parallel to the axis of rotation of said cutter body.

5. A cutting tool as defined in claim 4 wherein said tool cartridge is provided with at least one cutting edge.

6. A cutting tool as defined in claim 5 wherein said tool cartridge is provided with an insert having a cutting edge.

7. A cutting tool as defined in claim 5 wherein said cutting edge is formed of a polycrystalline diamond composite material.

8. A cutting tool as defined in claim 7 wherein said polycrystalline diamond composite material includes a cemented tungsten carbide backing.

9. A cutting tool as defined in claim 1 wherein the pockets of said cutter body are V-shaped.

10. A cutting tool as defined in claim 9 wherein said tool cartridge has a V-shaped cross-section.

11. A cutting tool comprising:

an annular cutter body having an axis of rotation, a radius, and a plurality of spaced apart V-shaped pockets for receiving tool cartridges formed in the peripheral margin of said body, each of the pockets being defined by a first surface and a second surface wherein the first and the second surfaces intersect to form the apex of the V-shaped pockets, a threaded bore hole formed in each of the pockets in said cutter body and extending radially inwardly from the apex of the V-shaped pockets in a direction perpendicular to the axis of rotation of said cutter body and along the radius of said cutter body;

a tool cartridge of a V-shape complimentary with the V-shape of the pockets of said cutter body to be received within each of the pockets of said cutter body, each of said cartridges being defined by a first surface and a second surface which intersect to form the apex of the V-shaped cartridges; and a threaded fastener extendable from the apex of the V-shape of each of said tool cartridges to be threadably received within a respective threaded bore hole of said cutter body and extending along the radius of said cutter body for retaining said cartridge within the pockets of said cutter body, said fastener extending along a path which bisects the angle defined by the first surface and the second surface of said tool cartridge.

* * * * *